(12) United States Patent
Seeberg

(10) Patent No.: US 8,276,456 B2
(45) Date of Patent: Oct. 2, 2012

(54) DIFFERENTIAL PRESSURE SENSOR

(75) Inventor: Bjorn Erik Seeberg, Oslo (NO)

(73) Assignee: Presens AS, Oslo (NO)

( * ) Notice: Subject to any disclaimer, the term of this patent is extended or adjusted under 35 U.S.C. 154(b) by 344 days.

(21) Appl. No.: 12/663,055

(22) PCT Filed: Jun. 3, 2008

(86) PCT No.: PCT/NO2008/000199
§ 371 (c)(1),
(2), (4) Date: May 19, 2010

(87) PCT Pub. No.: WO2008/150176
PCT Pub. Date: Dec. 11, 2008

(65) Prior Publication Data
US 2010/0281991 A1    Nov. 11, 2010

(30) Foreign Application Priority Data
Jun. 8, 2007   (NO) .................................. 20072900

(51) Int. Cl.
*G01L 13/02*  (2006.01)
*G01L 15/00*  (2006.01)
(52) U.S. Cl. ................. 73/716; 73/715; 73/717; 73/723
(58) Field of Classification Search ........................ None
See application file for complete search history.

(56) References Cited

U.S. PATENT DOCUMENTS

| | | | | |
|---|---|---|---|---|
| 4,257,274 A | * | 3/1981 | Shimada et al. | 73/718 |
| 4,309,908 A | * | 1/1982 | Rapp et al. | 73/720 |
| 4,398,194 A | * | 8/1983 | Johnston | 73/718 |
| 4,578,735 A | * | 3/1986 | Knecht et al. | 361/283.4 |
| 4,586,108 A | * | 4/1986 | Frick | 361/283.3 |
| 5,012,677 A | * | 5/1991 | Shimada et al. | 73/721 |
| 6,330,829 B1 | * | 12/2001 | Kurtz et al. | 73/717 |

(Continued)

FOREIGN PATENT DOCUMENTS

| | | |
|---|---|---|
| EP | 1394522 A2 | 3/2004 |
| JP | 4299230 A | 10/1992 |
| JP | 2004028704 A | 1/2004 |

(Continued)

OTHER PUBLICATIONS

Norwegian Search Report for Norwegian Application No. 20072900, Nov. 30, 2007.

*Primary Examiner* — Lisa Caputo
*Assistant Examiner* — Jermaine Jenkins
(74) *Attorney, Agent, or Firm* — Conley Rose, P.C.

(57) ABSTRACT

A differential pressure sensor for measuring a pressure difference between two high-pressure environments is comprised of a sensor block including internal, oil-filled channels leading to an internally positioned differential pressure sensor element. Two process diaphragms are provided for transferring pressure from the high-pressure environments for isolating two distinct internal oil channels from the high-pressure environments. In order to achieve small internal oil volumes in the sensor block, additionally two separating discs, which initially separate between the two internal oil channels, are positioned in fluid communication with the high-pressure environments in order to block for the pressure from the high-pressure environments against the oil channels "from behind." The separating discs bear against abutment faces having small openings into the internal oil channels. The separating discs are preferably given a pre-tension, and the abutment faces are then shaped correspondingly having a slightly convex shape. Preferably, separating discs with no corrugations are used.

3 Claims, 4 Drawing Sheets

U.S. PATENT DOCUMENTS

| | | | |
|---|---|---|---|
| 6,543,291 B1 * | 4/2003 | Kurtz et al. | 73/716 |
| 6,796,185 B2 | 9/2004 | Kurosawa et al. | |
| 6,925,884 B2 * | 8/2005 | Hegner et al. | 73/716 |
| 7,284,437 B2 * | 10/2007 | Krippner et al. | 73/716 |

FOREIGN PATENT DOCUMENTS

| | | |
|---|---|---|
| WO | 9217757 | 10/1992 |
| WO | 0206785 A1 | 1/2002 |

* cited by examiner

US 8,276,456 B2

DIFFERENTIAL PRESSURE SENSOR

CROSS-REFERENCE TO RELATED APPLICATIONS

This application is a 35 U.S.C. §371 national stage application of PCT Application No. PCT/NO2008/000199, filed 3 Jun. 2008, and entitled Differential Pressure Sensor, hereby incorporated herein by reference, which claims priority to Norwegian Patent Application No. 2007 2900, filed 8 Jun. 2007, hereby incorporated herein by reference.

STATEMENT REGARDING FEDERALLY-SPONSORED RESEARCH OR DEVELOPMENT

Not applicable.

BACKGROUND

U.S. Pat. No. 6,796,185 introductorily describes a differential pressure sensor based on older technology, wherein from a high-pressure side and a low-pressure side (actually two high pressures, with one pressure being higher than the other), two different pressures are transferred to two trapped oil volumes in channels within the sensor. A desire exists to protect an internally located differential pressure sensor (a) from being exposed to possible aggressive chemical substances, and (b) from being exposed to an extreme differential pressure should one of the two external pressures suddenly drop to zero, for example. Accordingly, in consideration of a), internal oil volumes are used, so that the internal pressure sensor is located solely in an oil environment. As to b), a favorable design using diaphragms with a deflection restriction ensures that an overpressure event cannot be transferred to the internal pressure sensor. The older technology shown in FIG. 2 of the US Patent provides definitions of the diaphragms included: Two outer diaphragms, being exposed to the external process environments which differential pressure is to be measured, is referred to as "process diaphragms." These diaphragms separate the internal oil environments within the sensor from the external process environments and transfer the two pressures into the sensor. Inside the sensor, a diaphragm is located that separates the two oil volumes/pressures from each other and that is able to flex in both directions inside a chamber. This diaphragm is referred to herein as a "separating disc."

From JP 4-299230 a differential pressure sensor is known comprising two diaphragms on a high-pressure side and one diaphragm on a low-pressure side. A pressure sensor is connected to one of the diaphragms on the high-pressure side, and from the pressure sensor a channel runs that branches to the other high-pressure side diaphragm and to the diaphragm on the low-pressure side. In reality, this pressure sensor works according to a rather simple differential measurement principle. All three diaphragms are process diaphragms, and it has to be assumed that only a single separating disc is used, such as in the prior art referred to above.

U.S. Pat. No. 6,796,185 then describes an improvement of the above technology, still comprising two outer process diaphragms exposed to the external environments, but wherein additionally two inner separating discs are used. Each of these discs is only able to deflect in one direction, as both discs bear against a restricting surface. That is, in this case the pressure transferring mechanism is a diaphragm assembly that (from each process pressure side) is comprised of an outer, planar process diaphragm transferring pressure from a process to the oil volume and a pre-tensioned, corrugated separating disc bearing against a concave abutment face within the sensor. The corrugated separating disc is pre-tensioned inwards towards the abutment face. Both the high-pressure side and the low-pressure side have a transferring mechanism consisting of a process diaphragm and a corrugated separating disc. The diaphragm assembly of the high-pressure side is positioned facing the diaphragm assembly of the low-pressure side in a lower part of the sensor. The space between the separating disc and the process diaphragm on the high-pressure side is filled with oil, and is connected with the differential pressure sensor and backside of the corrugated separating disc on the low-pressure side through a channel. There is also a similar channel connection from the space between the separating disc and the process diaphragm on the low-pressure side (the space being filled with oil) to the differential pressure sensor and the backside of the corrugated separating disc on the high-pressure side. The problem with this differential pressure sensor is that it contains large internal oil volumes. At a change in the temperature or pressure, the volume of this oil will change, either due to thermal expansion or compression or a combination thereof. This volume change must be compensated for by the process diaphragms, so that these introduce a pressure drop that will deteriorate the measurements. With a smaller oil volume, this measurement inaccuracy will be reduced. This is particularly important when the line pressure is many times greater than the differential pressure.

The same volume change will cause the cutoff pressure to change. A smaller volume results in a smaller volume change, providing a more precisely defined cutoff pressure.

The publication WO 92/17757 also shows a differential pressure sensor comprising two separating discs, in a similar manner as in the above US Patent, and exhibiting similar problems with respect to internal oil volumes.

SUMMARY OF THE INVENTION

Thus, according to embodiments of the present invention, a differential pressure sensor is provided comprising a sensor block having internal, oil-filled channels leading into a cavity with a differential pressure sensor element arranged therein, and having two respective process diaphragms arranged on the sensor block directly exposed to respective high-pressure environments with respective pressures to separate between the high-pressure environments and the internal oil channels and to transfer the respective pressures to respective channels. The differential pressure sensor is characterized in that two respective separating discs are arranged on the sensor block in fluid communication with the respective high-pressure environments in order to block for the respective pressures against reverse/opposite respective internal oil channels, that each of the two respective separating discs bears against a respective abutment face having a small opening into that of the oil-filled channels that exhibits the other pressure, and that a transverse channel is provided between the two respective oil channels, in which transverse channel the cavity containing the differential pressure sensor element is arranged.

Preferably, the separating discs are pre-tensioned to have a substantially complementary shape to the abutment faces, which have a slightly convex shape.

Preferably, substantially even separating discs are used, i.e. separating discs with no corrugations.

As apparent from the above, the configuration according to embodiments of the present invention is so that not only the two process diaphragms are exposed to the two respective external process environments, but also the two separating discs face outwardly against the respective two external environments. Since the two separating discs bear against abutment faces/stop faces with only a thin oil film located therebetween, the oil volumes which in the prior art existed between the process diaphragm and separating disc are replaced with volumes within the two process diaphragms, i.e. between each process diaphragm and an inner abutment face. As such a volume can be made much smaller than the volume necessary between two diaphragms, a significant oil volume is disposed of. This provides for increased measurement accuracy as well as a more precisely defined cutoff pressure.

Embodiments of the present invention provide a less expensive and more robust and accurate sensor. The oil volume may be kept at a minimum, and is less than half of the volume necessary when using an internal separating disc. Also, the process diaphragms do not need to service the volume needed by the separating disc(s), and the error contribution is reduced.

BRIEF DESCRIPTION OF THE DRAWINGS

In the following, embodiments of the invention will be described with reference to the attached drawings, in which.

DETAILED DESCRIPTION

Figure 1:
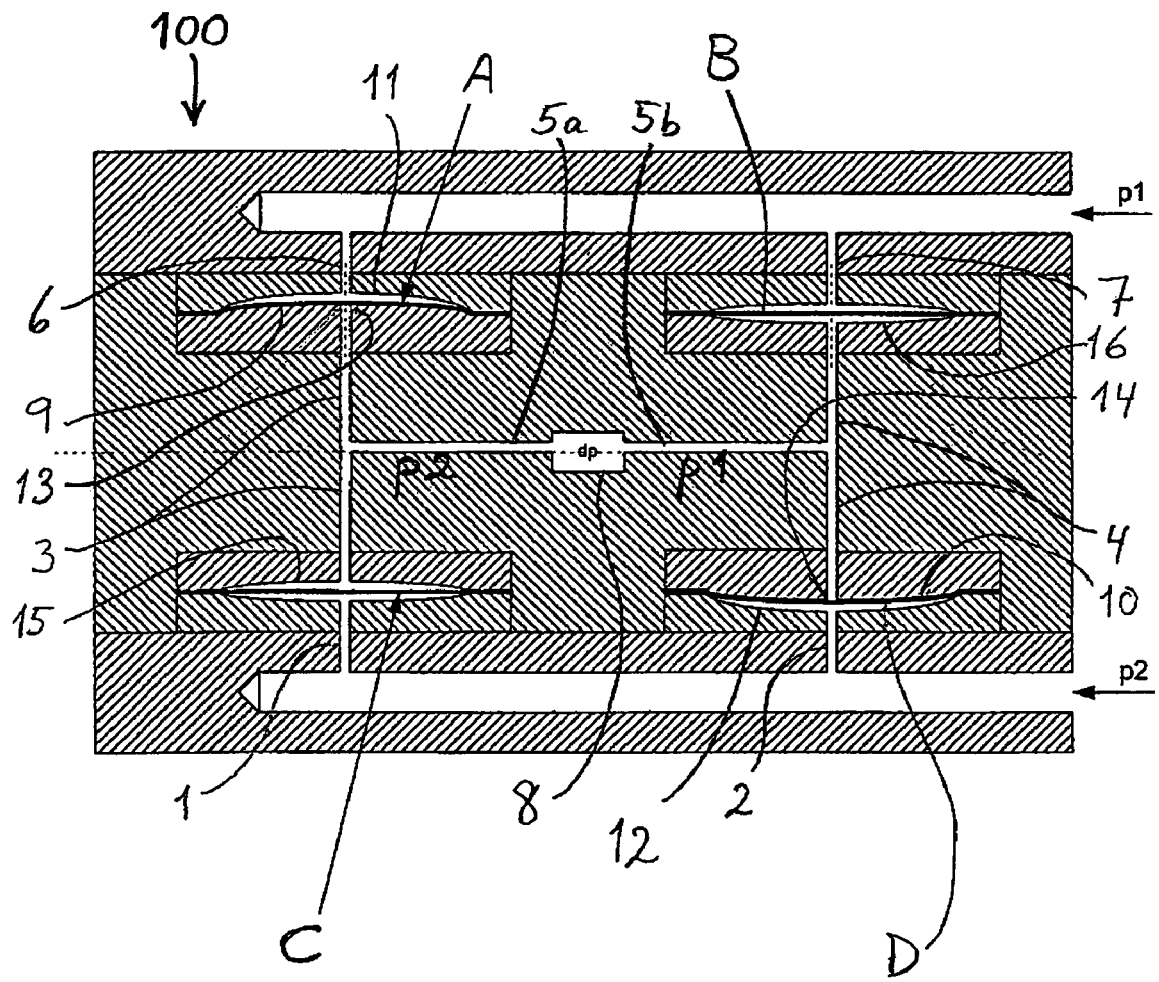
FIG. 1 shows a differential pressure sensor according to an embodiment of the invention.

In FIG. 1 is illustrated a principle drawing of a possible embodiment of a differential pressure sensor according to the present invention. A housing or sensor block 100 contains symmetrically disposed channels 1-7 for transferring pressure to a differential pressure sensor element located in a central chamber 8. The internal channels 3-5 have a small cross-section so that the volume of a hydraulic oil with which they are filled is small.

The oil-filled internal channels 3-5 are shielded, by diaphragms, from two external environments with high pressures p1 and p2r respectively, as shown with arrows to the right in the figure. The purpose of the sensor is to measure the pressure differential, dp, between pressures p1 and p2 in such a manner that the sensor element itself, represented symbolically in the figure by the term dp in the central chamber 8, is not exposed to any of the external environments (with chemicals, temperatures) but only to pressure-transferring hydraulic oil. Additionally, the pressure differential internally in the sensor must not be allowed to become so high that the sensor element is damaged.

The shielding against the two external environments is provided by four diaphragms A, B, C, D. Diaphragms B and C are referred to as "process diaphragms." The purpose of these diaphragms is to transfer the actual pressure p1 or p2 to the internal oil volume. Diaphragms A and D are referred to as "separating discs", and are flat diaphragms, that is, planar or smooth in the sense that they have no corrugations. In the case depicted, however, these diaphragms are pre-tensioned and positioned adjacent to an adapted curved (convex) abutment face/fitting surface 9, 10, and has a complementary shape to the abutment face 9, 10. Between separating disc A/D and the underlying abutment face 9/10 there is only a thin hydraulic oil film. In abutment faces 9, 10 there are openings 13, 14 into oil channels 3, 4. It can be seen that high pressure p1 is transferred through process diaphragm B to the internal channels 4 and 5b, that is, the right hand side of sensor element dp. Similarly (e.g. lower) high pressure p2 is transferred through process diaphragm C to the internal channels 3 and 5a, i.e. the left hand side of dp.

If p1>p2, separating disc A will be pressed in the downward direction in the figure, but will not be able to move. Separating diaphragm A will absorb the pressure difference p1−p2, i.e. the lower pressure p2 will remain on the left hand side of dp. At the same time, the higher pressure p1 on the right hand side will force separating disc D downwards, away from abutment face 14. In a certain position, the stresses in separating disc D absorb the pressure difference p1−p2, i.e. that is, separating disc D will assume a position further down the larger the difference p1−p2. If p1−p2 exceeds a certain limit, separating disc D in the shown case will come to bear against a lower abutment face 12, which also has a form adapted shape, i.e. a relatively correspondingly curved shape limits the space available for the separating disc both on the upper and lower sides.

It should be noted that the volumes of the spaces around the separating discs and process diaphragms in the exemplary embodiment shown is adapted to each other, i.e. the volume above process diaphragm C (when in the center position) is slightly smaller than the volume in the space above separating disc A, and likewise for the spaces below B and D on the right hand side. Because the hydraulic oil between the separating disc and process diaphragm is substantially incompressible, the separating disc and process diaphragm move "in concert." It is important that any large pressure differentials occurring will not cause failure of the central sensor element dp.

Typical values for the external pressure may be p1≈p2≈1000 bar, while the sensor element dp has a measurement range of 0-500 mbar and is not able to resist high pressure differences.

If initially the pressure p2 was present as normally (i.e. having an ordinary, small difference relative to p1) and then suddenly p2 drops to zero, separating disc A will immediately balance the large pressure difference and the oil pressure on the left hand side will drop to nearly zero. Process diaphragm C will not move to any great extent due to the incompressibility of the oil, but it will transfer a pressure≈0 between the external environment at the downside and the oil in channel 3.

At the same time, on the right hand side, both process diaphragm B and separating disc D will rush downwardly to abutment against the respective abutment faces (16 resp. 12) on the underside. However, if the dimensions are chosen so that process diaphragm B reaches the abutment first, then separating disc D will stop before abutment due to the incompressibility of the oil. The pressure in channel 4 will then drop immediately to approximately zero (at the same time as in channel 3), except for a small overpressure that is balanced by the stress forces in separating disc D. The sensor dp is able to resist such a small pressure difference, and is protected against an excessive overpressure.

In the case of a large overpressure in the opposite direction the device functions on the same manner, but in the opposite directions with respect to separating discs and process diaphragms.

In the above observation it appeared that if the volume inside a process diaphragm, e.g. represented by the distance to abutment face 16 below process diaphragm B, is small, separating disc D will only be able to move a limited distance outwards/downwards from abutment face 14. Therefore, it is not really necessary to include abutment faces such as 11 and 12 outside of separating discs A and D.

Similarly, it is also not necessary to include such abutment faces as shown on the outer sides of process diaphragms B and C, which shows that channels 1, 2, 6, and 7 can also be omitted.

Figure 2:
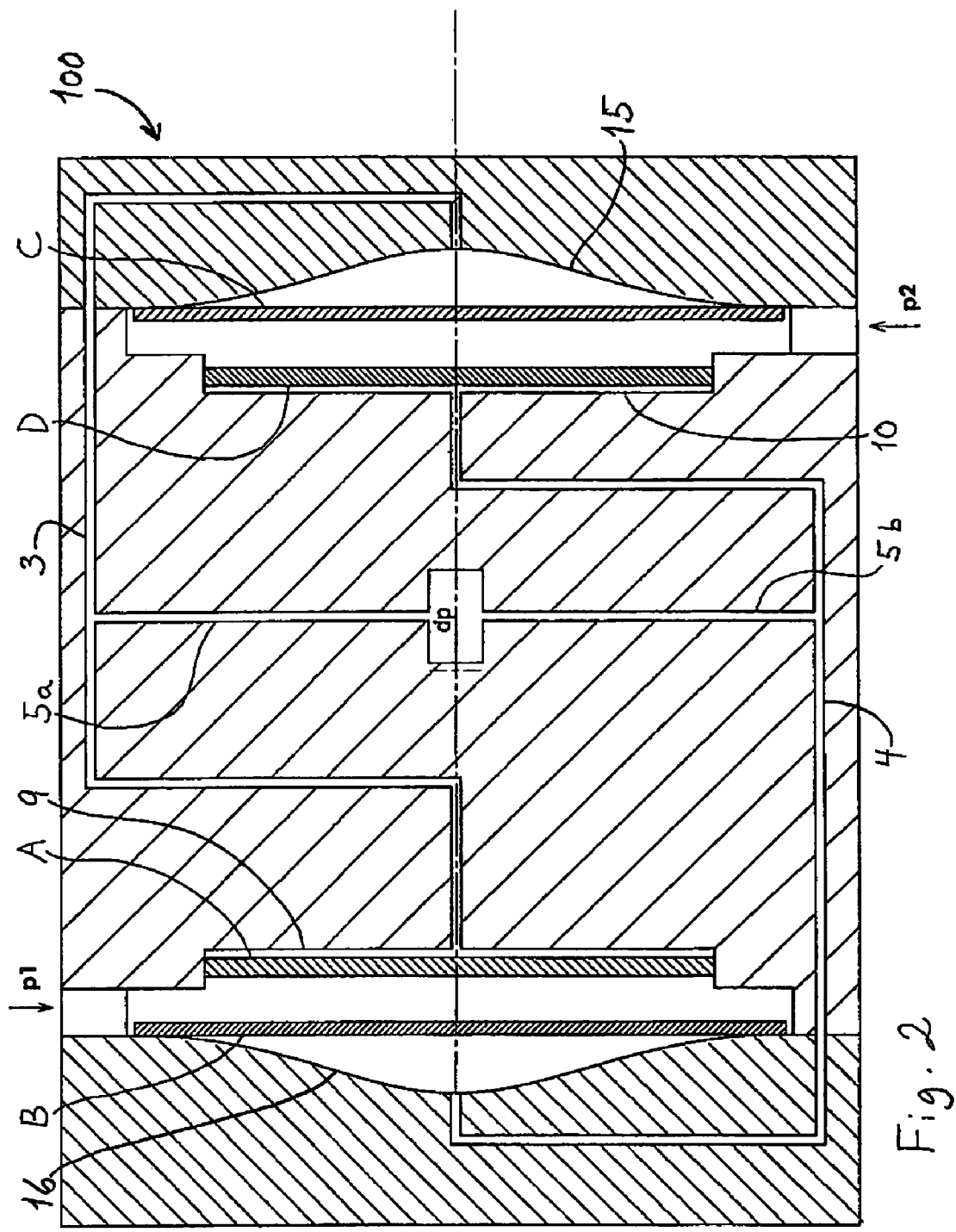
FIG. 2 shows a differential pressure sensor according to another embodiment of the invention.
Figure 3:
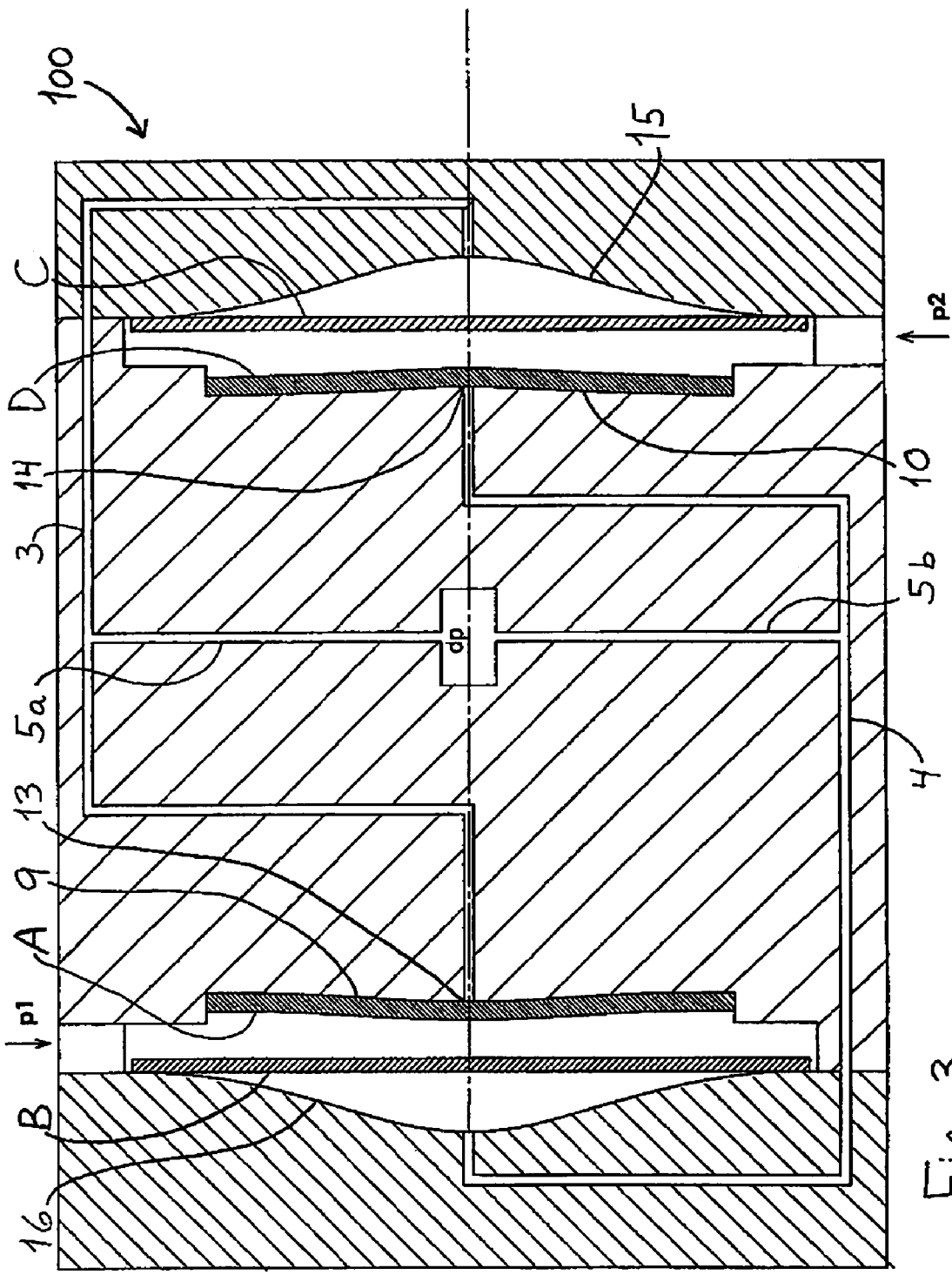
FIG. 3 shows a differential pressure sensor according to a further embodiment of the invention.

In FIGS. 2 and 3, such simplified embodiments are shown.

FIG. 2 schematically shows an alternative embodiment of the present invention. Also in this embodiment each high pressure p1 and p2 respectively acts on both a process diaphragm B and C respectively and one separating disc A and D respectively.

However, a difference as compared with the first embodiment is that there is no "safety abutment/stop faces" outside all diaphragms, i.e. corresponding faces such as the curved abutment face 11 above separating disc A in FIG. 1, for example.

This means that should e.g. p1, increase strongly in FIG. 2, process diaphragm B would move to the left and separating disc D would be lifted out to the right, perhaps beyond the point of rupture. This means that the "chamber volume" to the left of process diaphragm B must be kept so small that the diaphragms are only able to move a short distance to the left before abutting against face 16, i.e. sufficiently short so that the "bulging" of separating disc D will always remain well within its limit of weakening. Of course, the same applies for the A-C pair.

It must be noted that the dimensions shown in FIGS. 2 and 3 are not to scale. As mentioned, abutment face 16 is located relatively close to process diaphragm B, while the size of the space behind (to the right for) separating disc A is exaggerated. In reality, separating disc A is positioned in close vicinity to abutment face 9 (and separating disc D close to face 10), with only an oil film located therebetween.

In FIG. 3, the latter feature can be clearly seen, as separating discs A and D therein are shown to be situated adjacent to their respective abutment faces 9 and 10. The further feature separating the embodiment of FIG. 3 from the embodiment of FIG. 2, is that separating discs A and D have been given a pre-tension and that abutment faces 9 and 10 has been given a concave shape. Through the use of pre-tensioned separating discs a similar advantage as the one pointed out in the above referenced U.S. Pat. No. 6,796,185 is achieved, namely that the separating discs will remain stationary until the pre-tensioning pressure is overcome, and may thereafter be softer so that a volume change caused by pressure or temperature does not alter the cutoff pressure significantly. This will facilitate the use of more sensitive differential pressure sensor elements.

In other respects the embodiment of FIG. 3 is identical to the one shown in FIG. 2.

FIGS. 1, 2, and 3 all show embodiments in which the internal channels 3, 4, 5 are narrow channels filled with an hydraulic oil, and these channels lead into an internal space 8 wherein a differential pressure sensor dp is located, which sensor will not be described in further detail herein. Channels 3 and 4 start and end in openings 13 and 14 in abutment faces 9 and 10 behind separating discs A and D, and in corresponding openings of abutment faces 16 and 15 on the inside of process diaphragms B and C. These openings must be small, i.e. sufficiently small for separating discs A and D not to puncture even in the event of a maximum possible pressure difference between the outside (process environment side) of the separating disc and channels 3/4 on the inside thereof. (Separating discs in the form of an "INCONEL 625" foil having a thickness of 0.05 mm has been tested to be able to resist an opening size with a diameter of 0.3 mm at a pressure of 2800 bars). The same size requirements also apply to the openings on the inside of process diaphragms B and C, which must also be protected from puncturing.

It should further be noted that it is possible also to use corrugated separating discs, but separating discs without corrugations are cheaper.

Figure 4:
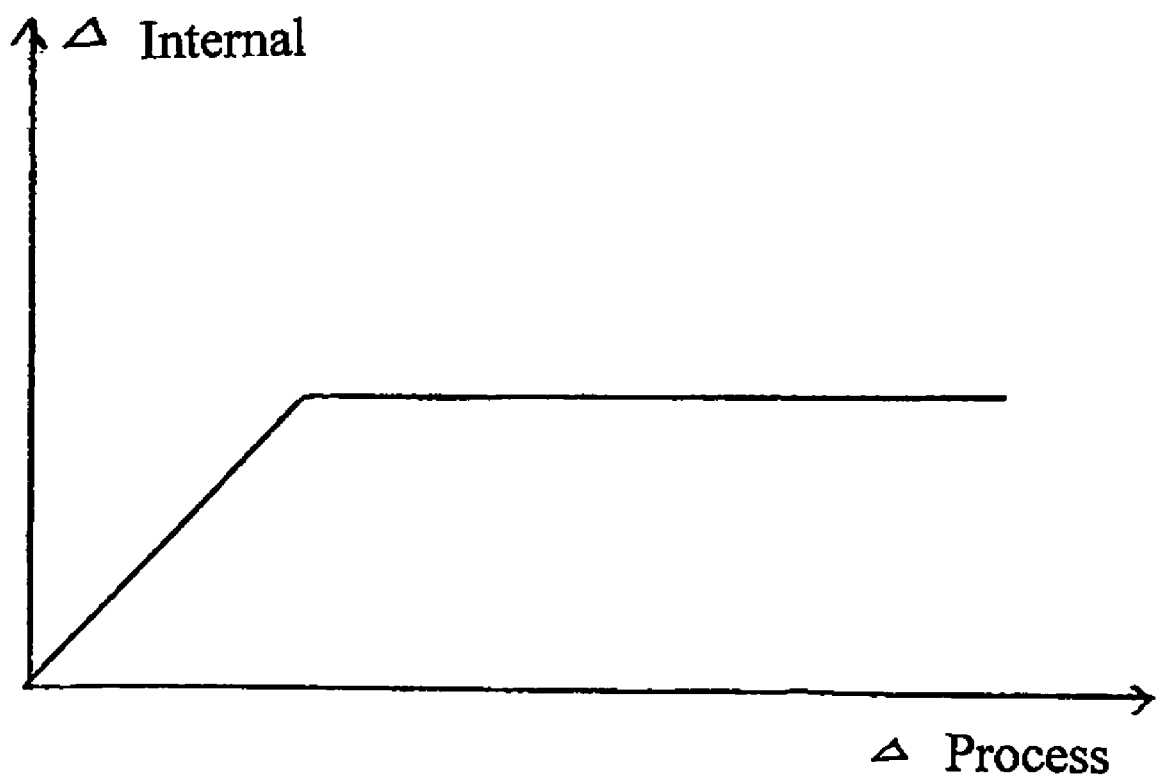
FIG. 4 shows a sensor characteristic of internal pressure in the sensor as a function of the process pressure.

In FIG. 4, the ability of the design to protect the sensor element with respect to avoiding excessively large differential pressures/overpressures is illustrated. The measurement range of the sensor element mainly corresponds to the rising part of the curve, showing internal (measured) pressure difference $\Delta p$ as a function of outside pressure difference p1−p2≡$\Delta p$ process.

The rising part of the curve shows that the internal pressure difference corresponds to the pressure difference of the external environment, but at the break (cutoff) point process diaphragm B in FIG. 2, for example, runs into the wall 16, and an increased overpressure for p1 relative to p2 does not result in any further pressure increase in channel 4. The stress forces in separating disc D balance the internal overpressure.

Sensor blocks 100, as shown in FIGS. 1, 2, and 3, are preferably made of INCONEL 625. The material used for process diaphragms B, C may also be INCONEL 625 (foil). The sensor element may typically be based on silicon. Typical dimensions for a sensor block may be Ø 70 mm, length 100 mm. The diameters of the separating discs and process diaphragms are preferably in the range of 30-50 mm. The cross-section of the oil channels may be in the order of Ø 0.25 mm.

The invention claimed is:

1. A differential pressure sensor, comprising;
a sensor block comprising internal, oil-filled channels leading into a cavity with a differential pressure sensor element arranged therein, and comprising two respective process diaphragms arranged on the sensor block being directly exposed to respective high-pressure environments with respective pressures to separate between the high-pressure environments and the internal oil channels and to transfer the respective pressures to the respective channels;
two respective separating discs arranged on the sensor block in fluid communication with the respective high-pressure environments and capable of blocking the respective pressures against the opposite respective of said internal oil channels;
where each of the two respective separating discs bears against a respective abutment face comprising a small opening into that of the oil-filled channels exhibiting the other pressure; and
a transverse channel provided between the respective two oil channels, in which transverse channel the cavity containing the differential pressure sensor element is located.

2. The differential pressure sensor of claim 1, where the separating discs are pre-tensioned to have a substantially complementary fit to the abutment faces, which has a slightly convex form.

3. The differential pressure sensor of claim 1, where the separating discs are substantially smooth.

* * * * *